United States Patent
Baril et al.

(10) Patent No.: US 12,521,138 B2
(45) Date of Patent: Jan. 13, 2026

(54) SURGICAL TISSUE GRASPER INCLUDING A COMPLIANT JAW ASSEMBLY

(71) Applicant: Covidien LP, Mansfield, MA (US)

(72) Inventors: Jacob C. Baril, Norwalk, CT (US); Saumya Banerjee, Southington, CT (US); Justin J. Thomas, New Haven, CT (US); Garrett P. Ebersole, Hamden, CT (US)

(73) Assignee: Covidien LP, Mansfield, MA (US)

( * ) Notice: Subject to any disclaimer, the term of this patent is extended or adjusted under 35 U.S.C. 154(b) by 211 days.

(21) Appl. No.: 18/194,746

(22) Filed: Apr. 3, 2023

(65) Prior Publication Data
US 2023/0310017 A1 Oct. 5, 2023

Related U.S. Application Data

(60) Provisional application No. 63/326,994, filed on Apr. 4, 2022.

(51) Int. Cl.
*A61B 17/29* (2006.01)
*A61B 17/30* (2006.01)
*A61B 17/00* (2006.01)

(52) U.S. Cl.
CPC .... *A61B 17/30* (2013.01); *A61B 2017/00862* (2013.01); *A61B 2017/2902* (2013.01); *A61B 2017/294* (2013.01)

(58) Field of Classification Search
CPC ............ A61B 17/29; A61B 2017/2926; A61B 2017/2937; A61B 2017/2931; A61B 2017/00296; B25J 15/12
See application file for complete search history.

(56) References Cited

U.S. PATENT DOCUMENTS

| | | | |
|---|---|---|---|
| 5,147,378 A * | 9/1992 | Markham | A61B 17/29 294/100 |
| 9,795,403 B2 | 10/2017 | Staud | |
| 9,962,179 B2 | 5/2018 | Castro et al. | |
| 10,251,659 B2 | 4/2019 | Nelson et al. | |
| 10,335,178 B2 | 7/2019 | Taylor et al. | |
| 2001/0041893 A1* | 11/2001 | Bartel | A61B 17/29 606/51 |
| 2007/0135686 A1* | 6/2007 | Pruitt | A61B 17/0218 600/214 |

(Continued)

*Primary Examiner* — Katherine H Schwiker
(74) *Attorney, Agent, or Firm* — Draft Masters IP, LLC (57) ABSTRACT

A surgical tissue grasper includes a handle assembly having a trigger, an endoscopic assembly, and a jaw assembly. The endoscopic assembly includes an outer tube and a driver. The driver is movable within the outer tube and operatively coupled to the trigger. The jaw assembly includes a stem detachably coupled to the driver, and a pair of jaws extending distally from the stem such that actuation of the trigger transitions the pair of jaws between spaced apart and approximated configurations to enable clamping of tissue. Each jaw of the pair of jaws includes a gripping portion and an outer support. The gripping portion is configured to engage tissue. The outer support is disposed outward of the gripping portion and coupled to an end portion of the gripping portion to enable flexing of the gripping portion or the outer support when a clamping force applied to tissue exceeds a predetermined threshold.

19 Claims, 4 Drawing Sheets

(56) References Cited

U.S. PATENT DOCUMENTS

| | | | |
|---|---|---|---|
| 2011/0213409 A1* | 9/2011 | Leonhard | A61B 17/29 606/206 |
| 2017/0281210 A1* | 10/2017 | Aguirre, Jr. | A61B 17/285 |
| 2020/0289139 A1* | 9/2020 | Steinthorsson | A61B 34/76 |

* cited by examiner

SURGICAL TISSUE GRASPER INCLUDING A COMPLIANT JAW ASSEMBLY

CROSS REFERENCE TO RELATED APPLICATIONS

This application claims the benefit of and priority to U.S. Provisional Patent Application No. 63/326,994, filed Apr. 4, 2022, the entire contents of which is incorporated by reference herein.

TECHNICAL FIELD

The disclosure relates to surgical devices and, more particularly, to a surgical tissue grasper including a compliant jaw assembly.

BACKGROUND

In minimally invasive surgery, the surgical procedure is performed by access to the surgical site through one or more small incisions. The surgical site is visualized by an endoscope inserted through one of the incisions and various surgical devices are inserted through the incisions to manipulate tissue as desired. The advantages of minimally invasive surgery are well established which include reduced trauma to tissue, reduced chance of infection, faster patient recovery time, and lower hospital costs.

Minimally invasive surgical procedures typically require tissue to be grasped and held or manipulated. It would be advantageous to provide a surgical tissue grasper that limits clamping force to a predetermined threshold. Further, it would be desirable to provide a surgical tissue grasper that is also easy to manufacture and assemble, thereby reducing costs associated therewith.

SUMMARY

The disclosure describes a surgical tissue grasper that demonstrates a practical approach to meeting the performance requirements and overcoming usability challenges associated with grasping tissue.

In accordance with this disclosure, a surgical tissue grasper includes a handle assembly, an endoscopic assembly, and a jaw assembly. The handle assembly includes a trigger. The endoscopic assembly includes an outer tube and a driver. The outer tube extends distally from the handle assembly. The driver is movable within the outer tube and operatively coupled to the trigger. The jaw assembly includes a stem detachably coupled to the driver, and a pair of jaws extending distally from the stem such that actuation of the trigger transitions the pair of jaws between spaced apart and approximated configurations to enable clamping of tissue between the jaws. Each jaw of the pair of jaws includes a gripping portion and an outer support. The gripping portion is configured to engage tissue. The outer support is disposed outward of the gripping portion and coupled to an end portion of the gripping portion to enable flexing of the gripping portion or the outer support when a clamping force applied to tissue exceeds a predetermined threshold.

In an aspect, the stem and the gripping portions of the jaw assembly may be monolithically formed.

In another aspect, the stem of the jaw assembly and the gripping portions may be formed of a compliant material.

In yet another aspect, the stem and the pair of jaws of the jaw assembly may be molded as a single construct.

In still yet another aspect, each outer support may include a proximal portion defining a cutout configured to receive a distal end portion of the outer tube of the endoscopic assembly.

In still yet another aspect, the proximal portion of the outer support may include an anchoring wall defining the cutout. The distal end portion of the outer tube may detachably support the anchoring wall of the outer support.

In an aspect, the proximal portion of the outer support may have an arcuate profile corresponding to a circumferential curvature of the outer tube.

In another aspect, the stem of the jaw assembly may be in tension along a longitudinal axis of the stem.

In yet another aspect, the stem of the jaw assembly may include a proximal portion having a coupling portion detachably coupled to a distal end of the driver.

In still yet another aspect, the coupling portion of the stem of the jaw assembly may include an arcuate portion. The distal portion of the driver may define a bore dimensioned to receive the arcuate portion of the stem such that the driver imparts axial displacement to the jaw assembly.

In accordance with another aspect of the disclosure, a surgical tissue grasper includes an endoscopic assembly and a jaw assembly. The endoscopic assembly includes an outer tube and a driver slidably disposed in the outer tube. The jaw assembly includes opposing jaws and a stem. The opposing jaws define a gap to receive tissue therebetween. Each jaw includes an outer support and a gripping portion. The outer support includes proximal and distal portions. The proximal portion of the outer support is supported against a distal end portion of the outer tube of the endoscopic assembly. The gripping portion is coupled to the distal portion of a corresponding outer support. The stem is coupled to the gripping portions of the opposing jaws and the driver such that axial displacement of the driver transitions the opposing jaws between spaced apart and approximated configurations to enable clamping of tissue. The gripping portions or the outer supports are configured to flex when a predetermined threshold of clamping force is reached in order to limit a maximum clamping force to the predetermined threshold.

In an aspect, at least a portion of the jaw assembly may be formed of a compliant material.

In another aspect, each jaw of the opposing jaws may define a gap between the gripping portion and the outer support when the jaw assembly is in the spaced apart configuration.

In yet another aspect, each jaw of the opposing jaws may be monolithically formed.

In still yet another aspect, the stem of the jaw assembly may have a coupling portion having an arcuate profile. The driver may define a bore dimensioned to receive the coupling portion of the stem of the jaw assembly.

In an aspect, each outer support may define a cutout configured to receive a portion of the distal end portion of the outer tube.

In another aspect, each outer support may have an anchoring wall defining the cutout.

The stem of the jaw assembly may be in tension such that the anchoring wall is detachably supported against the distal end portion of the outer tube.

In accordance with yet another aspect of the disclosure, a surgical tissue grasper includes an endoscopic assembly and a jaw assembly. The endoscopic assembly includes an outer tube and a driver movable in the outer tube. The jaw assembly includes opposing jaws and a stem. Each jaw includes an outer support and a gripping portion. The outer support includes proximal and distal portions. The proximal portion is supported against a distal end portion of the outer tube of the endoscopic assembly. The gripping portion is coupled to the distal portion of the corresponding outer support. The stem interconnects the opposing jaws and the driver such that axial displacement of the driver transitions the opposing jaws between spaced apart and approximated configurations to enable clamping of tissue. At least one jaw of the opposing jaws is configured to flex when a predetermined threshold of clamping force is reached, thereby limiting a maximum clamping force to the predetermined threshold.

In an aspect, the jaw assembly may be molded as a single construct.

In another aspect, the outer supports may define a gap with the respective gripping portions in the spaced apart configuration.

BRIEF DESCRIPTION OF THE DRAWINGS

The above and other aspects and features of this disclosure will become more apparent in view of the following detailed description when taken in conjunction with the accompanying drawings wherein like reference numerals identify similar or identical elements.

DETAILED DESCRIPTION

The surgical tissue grasper device disclosed herein is described in detail with reference to the drawings, in which like reference numerals designate identical or corresponding elements in each of the several views.

As used herein, the term "distal" refers to the portion that is being described which is farther from a user, while the term "proximal" refers to the portion that is being described which is closer to a user. In addition, the terms parallel and perpendicular are understood to include relative configurations that are substantially parallel and substantially perpendicular up to about + or −10 degrees from true parallel and true perpendicular. Further, to the extent consistent, any or all of the aspects detailed herein may be used in conjunction with any or all of the other aspects detailed herein.

Figure 1:
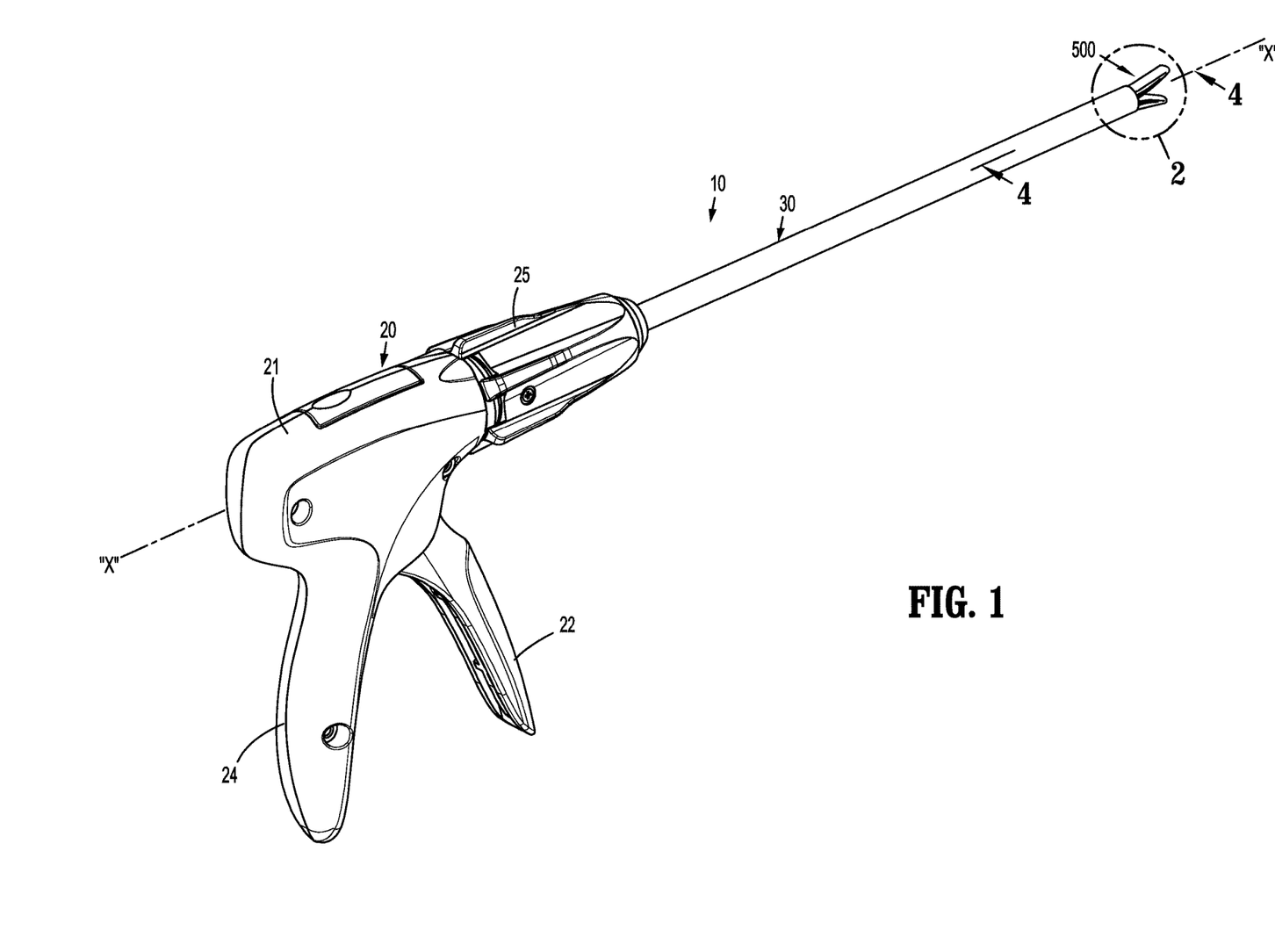
FIG. 1 is a perspective view of a surgical tissue grasper in accordance with the disclosure.

In FIG. 1, an exemplary surgical tissue grasper in accordance with the disclosure is shown generally as 10. The surgical tissue grasper 10 is adapted to be particularly useful in endoscopic or laparoscopic procedures. An endoscopic portion of the surgical tissue grasper 10 such as, e.g., an endoscopic assembly 30, is insertable into an operative site, via a cannula assembly, an opening in body tissue, or the like. The surgical tissue grasper 10 includes a handle assembly 20, the endoscopic assembly 30 extending distally from the handle assembly 20, and a jaw assembly 500 operatively coupled to the handle assembly 20. The handle assembly 20 includes a trigger 22, a stationary handgrip 24, and a rotation knob 25. The handle assembly 20 supports the endoscopic assembly 30 and includes a body 21 that defines the stationary handgrip 24. The trigger 22 is movable in relation to the stationary handgrip 24 to effect approximation of the jaw assembly 500 between a spaced apart configuration (FIG. 4) and an approximated configuration (FIG. 5) to enable clamping of tissue. The handle assembly 20 supports the rotation knob 25 that is engaged with the endoscopic assembly 30 such that rotation of the rotation knob 25 rotates the endoscopic assembly 30 in relation to the handle assembly 20 about a longitudinal axis "X-X" defined by the endoscopic assembly 30. Reference may be made to U.S. Patent Application Publication Nos. 2021/0145470, 2021/0113203, and 2014/0263550, and U.S. Pat. No. 10,368,876, the entire disclosure of each of which is incorporated herein by reference, for a detailed discussion of the construction and operation of the handle assembly 20 and the endoscopic assembly 30. It is envisioned that the jaw assembly 500 may be coupled to a mechanical or electro-mechanical handle. It is also envisioned that the surgical tissue grasper 10 may be part of a robotic surgical system.

Figure 2:
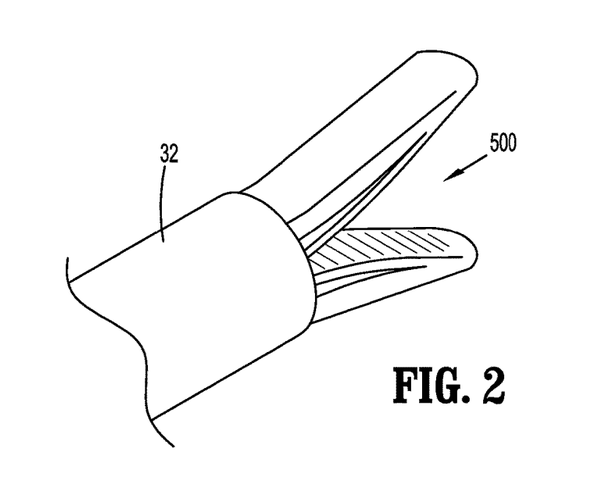
FIG. 2 is an enlarged view of the indicated area of detail of FIG. 1.
Figure 3:
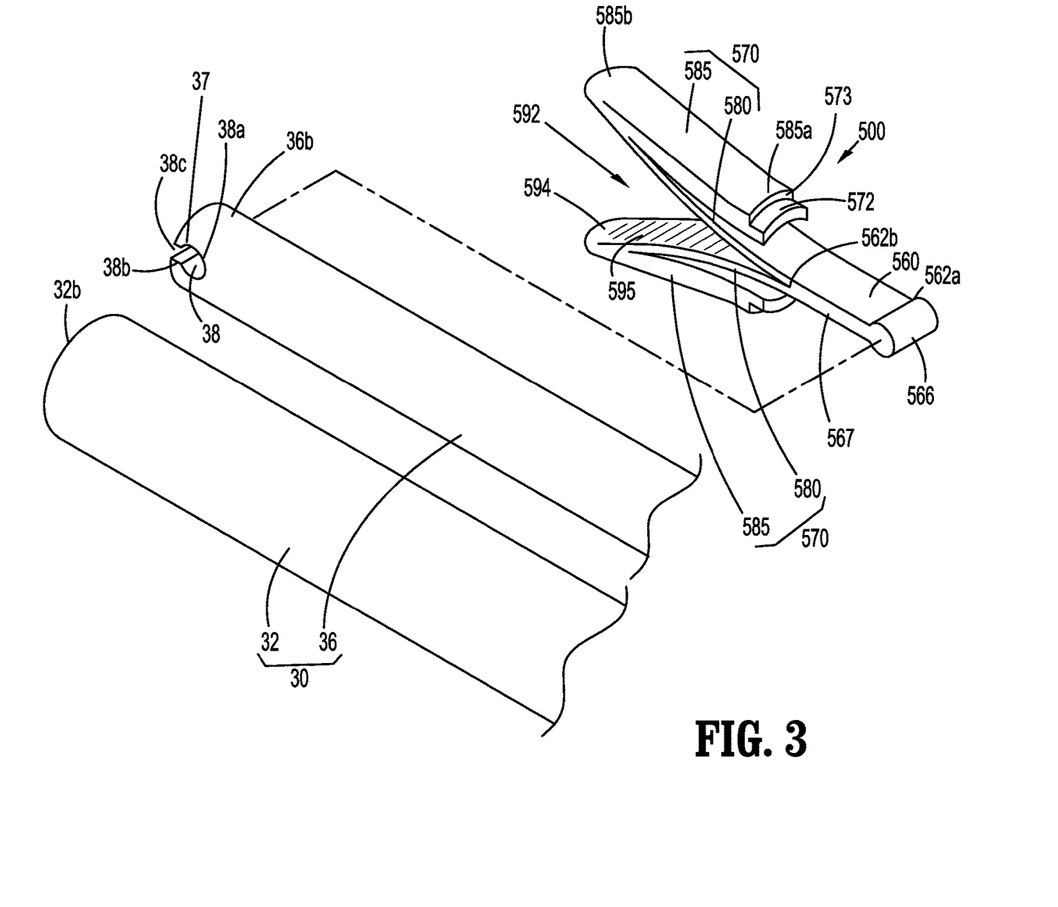
FIG. 3 is a partial exploded perspective view an endoscopic assembly and a jaw assembly of the surgical tissue grasper of FIG. 1 with parts separated.
Figure 4:
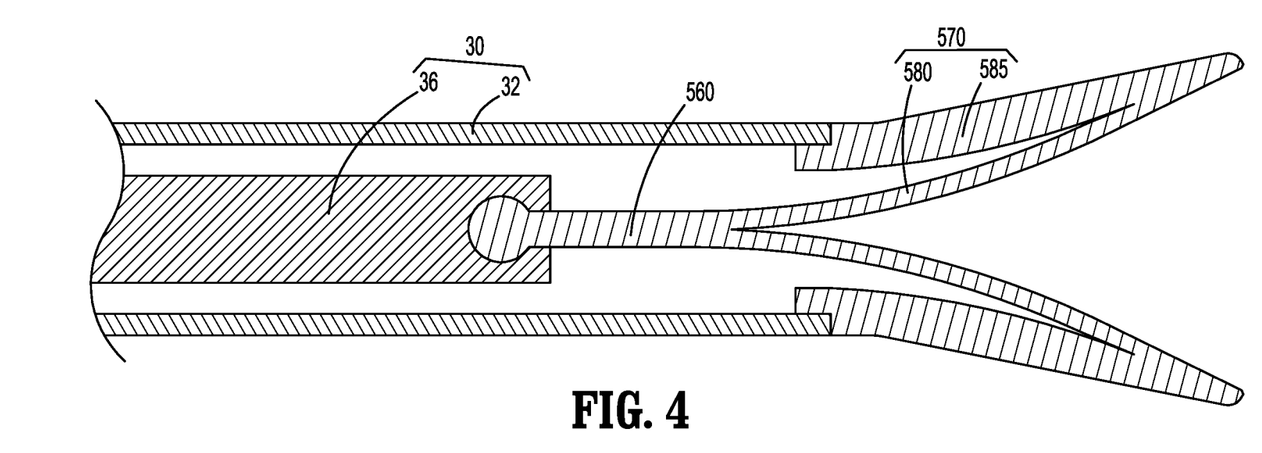
FIG. 4 is a side cross-sectional view taken along section line 4-4 of FIG. 1, illustrating jaws of the jaw assembly in a spaced apart configuration.
Figure 5:
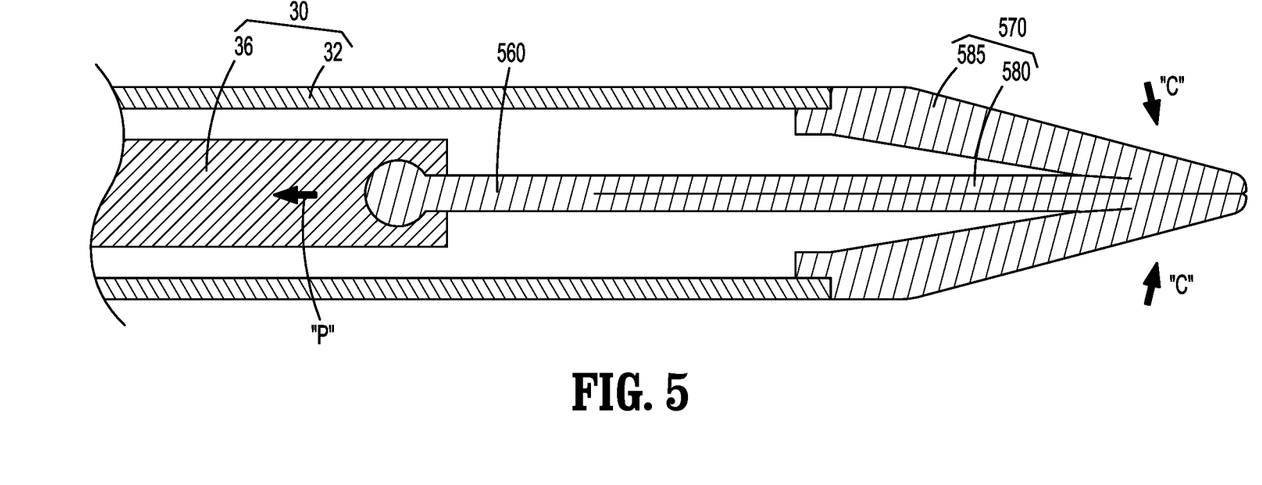
FIG. 5 is a cross-sectional view FIG. 1, illustrating the jaws of the jaw assembly in an approximated configuration.

The endoscopic assembly 30 extends distally from the handle assembly 20. FIGS. 2 and 3 illustrate the endoscopic assembly 30 including an outer tube 32 and a driver 36 operatively coupled to the trigger 22 (FIG. 1) of the handle assembly 20 such that when a clinician pulls the trigger 22 (FIG. 1) in relation to the stationary handgrip 24 (FIG. 1), the driver 36 is retracted, i.e., displaced proximally in the direction of an arrow "P" (FIG. 5). In an aspect, the trigger 22 may be biased to an unactuated position (as shown in FIG. 1), whereby the driver 36 is disposed in a distal-most position (FIG. 4). The driver 36 includes a distal portion 36b having a coupling portion 37. The coupling portion 37 may define a bore 38 having a head portion 38a and a neck portion 38b defining an opening 38c that leads into the head portion 38a.

With continued reference to FIGS. 2 and 3, the jaw assembly 500 is operatively coupled to the driver 36 of the endoscopic assembly 30. The jaw assembly 500 includes a stem portion 560 and a pair of jaws 570. The stem portion 560 includes a proximal portion 562a and a distal portion 562b. The proximal portion 562a includes a head portion 566 that is detachably securable with the coupling portion 37 of the driver 36. In particular, the head portion 566 has an arcuate profile that is dimensioned to be received in the head portion 38a of the bore 38 of the driver 36. In addition, the stem portion 560 further includes a neck portion 567 that extends distally from the head portion 566. When the head portion 566 of the stem portion 560 is received in the head portion 38a of the driver 36, the neck portion 567 of the stem portion 560 extends through the neck portion 38b of the driver 36. In particular, the head portion 566 of the stem portion 560 has a width or a diameter larger than a width of the neck portion 562 such that when the head portion 566 of the stem portion 560 is received in the head portion 38a of the driver 36, the jaw assembly 500 is secured with the driver 36 and movable with the driver 36 as a single construct. Under such a configuration, when the clinician pulls the trigger 22 (FIG. 1) of the handle assembly 20, the driver 36 is retracted in the direction of the arrow "P" (FIG. 5) and the stem portion 560 of the jaw assembly 500 is also displaced proximally in the direction of the arrow "P" to transition the pair of jaws 570 to the approximated configuration (FIG. 5). However, it is also contemplated that the stem portion 560 may define a bore and the driver 36 may include an arcuate head portion dimensioned to be received in the bore of the stem portion 560 for detachable coupling.

With particular reference to FIG. 3, the pair of jaws 570 extends distally from the distal portion 562b of the stem portion 560 of the jaw assembly 500. The jaws 570 may diametrically oppose each other. Each jaw 570 includes a gripping portion 580 and an outer support 585. In particular, the stem portion 560 bifurcates into two gripping portions 580 that define a gap 592 therebetween. In an aspect, the stem portion 560 and the gripping portions 580 may be formed as a single construct. In another aspect, the stem portion 560 and the gripping portions 580 may be monolithically formed. In another aspect, the stem portion 560 and the gripping portion 580 may be formed of a compliant or resilient material. Each gripping portion 580 includes a tissue contacting surface 594 that supports tissue. The tissue contacting surface 594 may include ribs or grooves 595 to reduce slippage and improve gripping of tissue. Each outer support 585 is disposed radially outward of the corresponding gripping portion 580.

In particular, each outer support 585 includes a proximal portion 585a and a distal portion 585b. The proximal portion 585a of the outer support 585 defines a cutout 572 configured to receive a portion of a distal end portion 32b of the outer tube 32. To this end, the proximal portion 585a may have an arcuate profile corresponding to a circumferential curvature of the outer tube 32. In particular, the outer support 585 includes an anchoring wall 573 that defines the cutout 572. The anchoring wall 573 is detachably supported against the distal end portion 32b of the outer tube 32. In an aspect, the stem portion 560 may be dimensioned to be in tension along a length of the stem 560 when coupled to the driver 36. Under such a configuration, the anchoring wall 573 of the outer support 585 is securely supported against the distal end portion 32b of the outer tube 32, irrespective of a position of the driver 36. This configuration further eliminates a need for additional parts such as, e.g., a pivot pin, that is used to support a jaw in a conventional jaw assembly. The distal portion 585b of the outer support 585 of the jaw 570 is coupled to the corresponding gripping portion 580. In an aspect, the distal portion 585b of the outer support 585 may form a living hinge with the corresponding gripping portion 580. In another aspect, each jaw 570 defines a gap 575 with the corresponding gripping portion 580. In an aspect, each jaw 570 may be formed as a single construct. In another aspect, each jaw 570 may be monolithically formed. In another aspect, at least a portion of each jaw 570 may be formed of a resilient or compliant material. It is contemplated that the jaw assembly 500 may be formed as a single construct. In particular, the jaw assembly 500 may be monolithically formed. In an aspect, the jaw assembly 500 may be molded. The jaw assembly 500 may be at least partially formed of a compliant or resilient material.

Under such a configuration, when a clamping force that exceeds a predetermined threshold is applied to tissue grasped between the jaws 570, the jaw assembly 500 inhibits the tissue contacting surfaces 594 from applying such force to tissue. This is done by allowing the gripping portions 580 and/or the outer supports 585 to buckle or flex under a load greater than the predetermined threshold. Alternatively, this may also be achieved by selecting a thickness of the gripping portion 580 and/or the outer support 585 that would enable buckling or flexing of the gripping portion 580 and/or the outer support 585 under a load greater than the predetermined threshold.

Figure 6:
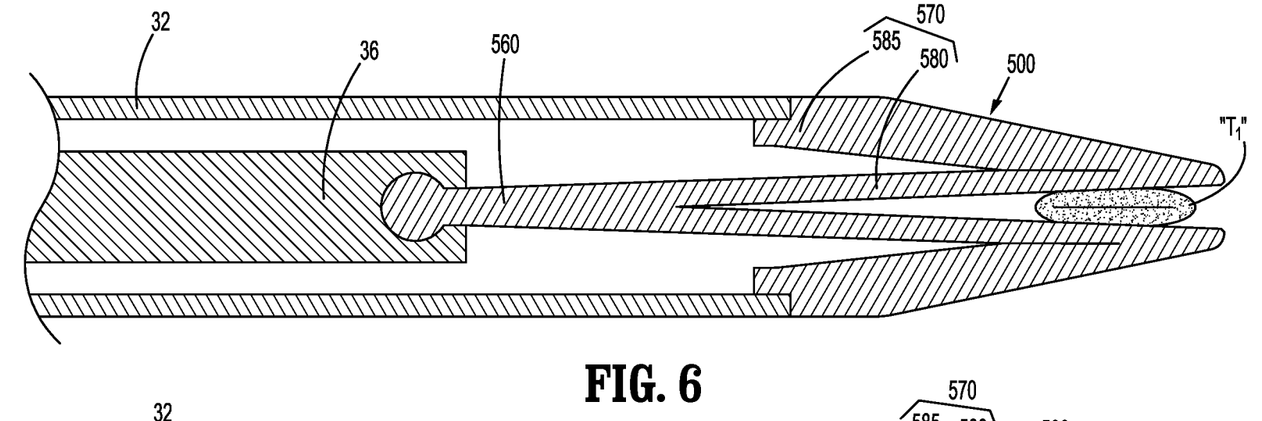
FIG. 6 is a partial side cross-sectional view of the surgical tissue grasper of FIG. 1, illustrating grasping of tissue.
Figure 7:
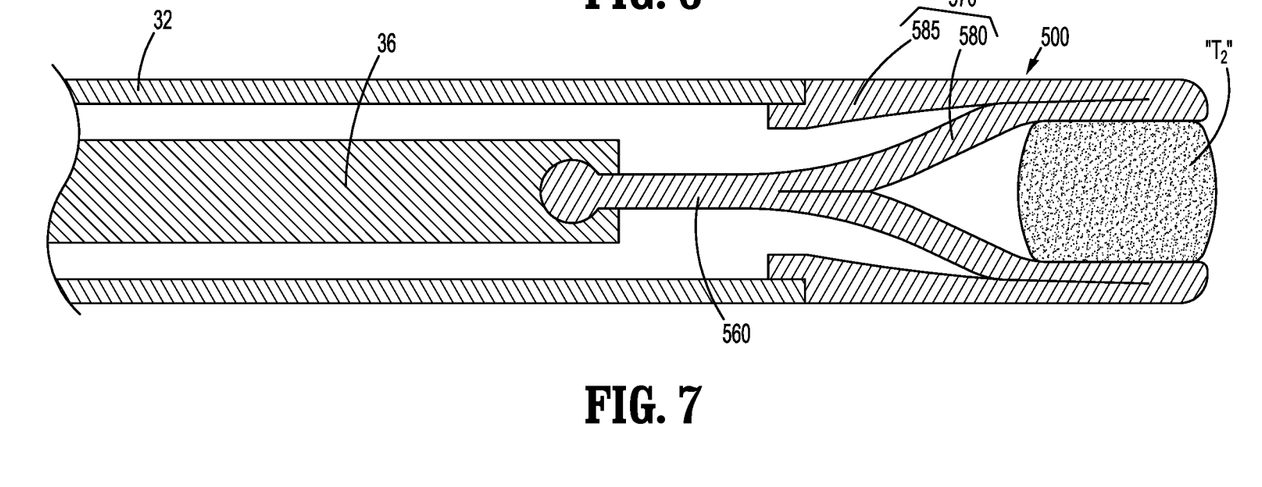
FIG. 7 is a partial side cross-sectional view of the surgical tissue grasper of FIG. 1, illustrating flexing of the jaw assembly when a clamping force applied to tissue exceeds a predetermined threshold.

FIG. 6 illustrates clamping of tissue "$T_1$" between the jaws 570 of the jaw assembly 500. In particular, tissue "$T_1$" is subject to a clamping force that is within the predetermined threshold. In this case, for example, the jaw assembly 500 (FIG. 6) has a shape that is substantially similar to the jaw assembly 500 in the approximated configuration without tissue (FIG. 5). In FIG. 7, tissue "$T_2$" is subject to a clamping force greater than the predetermined threshold, in which case, the outer supports 585 and the gripping portions 580 flex or deform to inhibit application of such force to tissue "$T_2$" and limit the force applied to tissue "$T_2$" to the predetermined threshold. For example, the outer supports 585 are deformed to be flush with the outer tube 32 and the gripping portions 580 are buckled or flexed, thereby reducing the clamping force applied to tissue "$T_2$". Under such a configuration, the clamping force applied to tissue "$T_2$" does not exceed the predetermined threshold. In this manner, tissue "$T_1$", "$T_2$" may be firmly grasped by the clinician while inhibiting the possibility of tissue trauma due to a large clamping force. This may be particularly useful in grasping, e.g., blood vessels.

In use, the driver 36 of the endoscopic assembly 30 is initially in a distal position (FIG. 4) such that the jaw assembly 500 is in the spaced apart configuration. As the trigger 22 (FIG. 1) of the handle assembly 20 is pulled by the clinician, the driver 36 (FIG. 4) is retracted in the direction of the arrow "P" (FIG. 5), which, in turn, causes axial displacement of the stem portion 560 of the jaw assembly 500 in the direction of the arrow "P". Such axial displacement of the stem portion 560 transitions the jaws 570 from the spaced apart configuration (FIG. 4) to the approximated configuration (FIG. 5), in which, the jaws 570 are displaced towards each other in the direction of arrows "C", thereby enabling clamping of tissue between the jaws 570. At this time, the anchoring wall 573 of the jaw assembly 500 may be supported against the outer tube 32 to enable rotation of the jaws 570. In the absence of tissue, the tissue contacting surfaces 594 of the jaw assembly 500 engage each other in the approximated configuration as shown in FIG. 5. When tissue is grasped between the jaws 570 in the approximated configuration, the gripping portions 580 and the outer supports 585 are compliant to inhibit application of clamping force greater than the predetermined threshold, thereby reducing trauma to tissue (FIG. 7).

While both jaws 570 are shown to transition between the spaced apart and approximated configurations, it is also contemplated that one of the jaws 570 may be stationary and the other jaw 570 may be movable between the spaced apart and approximated positions. It is envisioned that the surgical tissue grasper 10 may be configured to connect to a robotic arm of a robotic surgical system to enable manipulation and control thereof. It is to be understood; therefore, various other changes and modifications may be effected therein by one skilled in the art without departing from the scope or spirit of the disclosure.

While the disclosure has been shown in the drawings, it is not intended that the disclosure be limited thereto, as it is intended that the disclosure be as broad in scope as the art will allow and that the specification be read likewise. Therefore, the above description should not be construed as limiting, but merely as exemplifications. Those skilled in the art will envision other modifications within the scope and spirit of the claims appended hereto.

What is claimed is:

1. A surgical tissue grasper comprising:
a handle assembly including a trigger;
an endoscopic assembly including:

an outer tube extending distally from the handle assembly;
a driver movable within the outer tube and operatively coupled to the trigger; and
a jaw assembly including:
  a stem detachably coupled to the driver; and
  a pair of jaws extending distally from the stem such that actuation of the trigger transitions the pair of jaws between spaced apart and approximated configurations to enable clamping of tissue between the jaws, each jaw of the pair of jaws including:
    a gripping portion configured to engage tissue; and
    an outer support disposed outward of the gripping portion and coupled to an end portion of the gripping portion to enable flexing of the gripping portion or the outer support when a clamping force applied to tissue exceeds a predetermined threshold,
    wherein each outer support is separate and distinct from each other outer support, and wherein each outer support includes a proximal portion having a cutout defined by an anchoring wall having a distal-most surface, the cutout being configured to receive a distal end portion of the outer tube of the endoscopic assembly, and the distal-most surface of the anchoring wall being configured for direct contact with the distal end portion.

2. The surgical tissue grasper according to claim 1, wherein the stem and the gripping portions of the jaw assembly are monolithically formed.

3. The surgical tissue grasper according to claim 2, wherein the stem of the jaw assembly and the gripping portions are formed of a compliant material.

4. The surgical tissue grasper according to claim 1, wherein the stem and the pair of jaws of the jaw assembly are molded as a single construct.

5. The surgical tissue grasper according to claim 1, the distal end portion of the outer tube detachably supporting the anchoring wall of the outer support.

6. The surgical tissue grasper according to claim 5, wherein the proximal portion of the outer support has an arcuate profile corresponding to a circumferential curvature of the outer tube.

7. The surgical tissue grasper according to claim 5, wherein the stem of the jaw assembly is in tension along a longitudinal axis of the stem.

8. The surgical tissue grasper according to claim 1, wherein the stem of the jaw assembly includes a proximal portion having a coupling portion detachably coupled to a distal end of the driver.

9. The surgical tissue grasper according to claim 8, wherein the coupling portion of the stem of the jaw assembly includes an arcuate portion, and the distal portion of the driver defines a bore dimensioned to receive the arcuate portion of the stem such that the driver imparts axial displacement to the jaw assembly.

10. A surgical tissue grasper comprising:
an endoscopic assembly including:
  an outer tube; and
  a driver slidably disposed in the outer tube; and
  a jaw assembly including:
    opposing jaws defining a first gap to receive tissue therebetween, each jaw including:
      an outer support including a proximal portion and a distal portion, the proximal portion of the outer support being supported against a distal end portion of the outer tube of the endoscopic assembly;
      a gripping portion including a proximal portion and a distal portion; and
      a living hinge coupling the distal portion of the gripping portion to the distal portion of the corresponding outer support; and
    a stem coupled to the proximal portions of the gripping portions of the opposing jaws and the driver such that axial displacement of the driver transitions the opposing jaws between spaced apart and approximated configurations to enable clamping of tissue, the gripping portions or the outer supports being configured to flex when a predetermined threshold of clamping force is reached in order to limit a maximum clamping force to the predetermined threshold of clamping force.

11. The surgical tissue grasper according to claim 10, wherein at least a portion of the jaw assembly is formed of a compliant material.

12. The surgical tissue grasper according to claim 10, wherein each jaw of the opposing jaws defines a second gap between the gripping portion and the corresponding outer support when the jaw assembly is in the spaced apart configuration.

13. The surgical tissue grasper according to claim 10, wherein each jaw of the opposing jaws is monolithically formed.

14. The surgical tissue grasper according to claim 10, wherein the stem of the jaw assembly has a coupling portion having an arcuate profile, and the driver defines a bore dimensioned to receive the coupling portion of the stem of the jaw assembly.

15. The surgical tissue grasper according to claim 10, wherein each outer support defines a cutout configured to receive a portion of the distal end portion of the outer tube.

16. The surgical tissue grasper according to claim 15, wherein each outer support has an anchoring wall defining the cutout, the stem of the jaw assembly being in tension such that the anchoring wall is detachably supported against the distal end portion of the outer tube.

17. A surgical tissue grasper comprising:
an endoscopic assembly including:
  an outer tube;
  a driver movable in the outer tube; and
  a jaw assembly including:
    opposing jaws, each jaw including:
      an outer support including proximal and distal portions, the proximal portion of the outer support being supported against a distal end portion of the outer tube of the endoscopic assembly;
      a gripping portion including a proximal portion and a distal portion; and
      a living hinge coupling the distal portion of the gripping portion to the distal portion of the corresponding outer support; and
    a stem interconnecting the opposing jaws and the driver such that axial displacement of the driver transitions the opposing jaws between spaced apart and approximated configurations to enable clamping of tissue, wherein at least one jaw of the opposing jaws is configured to flex when a predetermined threshold of clamping force is reached, thereby limiting a maximum clamping force to the predetermined threshold.

18. The surgical tissue grasper according to claim 17, wherein the jaw assembly is molded as a single construct.

19. The surgical tissue grasper according to claim 17, wherein the corresponding outer support defines a gap with the gripping portion in the spaced apart configuration.

* * * * *